(12) United States Patent
Hijikata (10) Patent No.: US 6,448,908 B1
(45) Date of Patent: Sep. 10, 2002

(54) ON-VEHICLE NAVIGATION SYSTEM HAVING ROUTE SEARCHING FUNCTION

(75) Inventor: Makoto Hijikata, Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 850 days.

(21) Appl. No.: 09/110,397

(22) Filed: Jul. 6, 1998

Related U.S. Application Data (63) Continuation of application No. 08/582,732, filed on Jan. 4, 1996, now Pat. No. 5,877,708.

(30) Foreign Application Priority Data

Jan. 24, 1995 (JP) .................................................. 7-9024

(51) Int. Cl.[7] ............................................. G08G 1/123
(52) U.S. Cl. ........................ 340/995; 701/208; 701/211
(58) Field of Search ................................. 340/988, 990, 340/995; 701/201, 208, 209, 210, 211

(56) References Cited

U.S. PATENT DOCUMENTS

| | | | |
|---|---|---|---|
| 5,031,104 A | * 7/1991 | Ikeda et al. ................. | 340/995 |
| 5,041,983 A | 8/1991 | Nakahara et al. | |
| 5,146,219 A | * 9/1992 | Zechnall ..................... | 340/995 |
| 5,184,303 A | 2/1993 | Link .......................... | 340/995 |
| 5,237,323 A | 8/1993 | Saito et al. ................. | 340/995 |
| 5,243,528 A | 9/1993 | Lefebvre .................... | 340/990 |
| 5,272,638 A | 12/1993 | Martin et al. ............... | 340/395 |
| 5,371,678 A | 12/1994 | Nomura ...................... | 340/995 |
| 5,406,490 A | * 4/1995 | Braegas ...................... | 340/905 |
| 5,475,387 A | 12/1995 | Matsumoto ................. | 340/995 |
| 5,486,822 A | 1/1996 | Tenmoku et al. ........... | 340/995 |
| 5,506,779 A | 4/1996 | Kanki ......................... | 340/995 |
| 5,521,826 A | 5/1996 | Matsumoto | |
| 5,557,524 A | * 9/1996 | Maki .......................... | 340/995 |
| 5,568,390 A | * 10/1996 | Hirota et al. ............... | 340/990 |
| 5,608,635 A | * 3/1997 | Tamai ......................... | 340/995 |

* cited by examiner

Primary Examiner—Brent A. Swarthout
(74) Attorney, Agent, or Firm—Sughrue Mion, PLLC

(57) ABSTRACT

An on-vehicle navigation system having a route searching function for automatically selecting a guiding route to a destination in consideration of run experiences of the user. Run experience data indicative of the run experience is formed every road unit which the vehicle has run and is stored, a plurality of traveling routes which a vehicle can run between a start point and the destination are searched for and weights of the road units in the traveling route and the corresponding run experience data is obtained from memory for each of the plurality of traveling routes in the route searching operation, the weight of each road unit in the traveling route is corrected by the corresponding run experience data for each of the plurality of traveling routes, a sum value of the corrected weights corresponding to the road units in the traveling route is calculated for each of the plurality of traveling routes, and a traveling route of which sum value is the minimum is selected from the plurality of traveling routes. The route including the roads which the user has run previously is preferentially selected as a guiding route, so that a route search which makes the most of the run experience of the user is performed.

14 Claims, 6 Drawing Sheets

| ROAD NUMBER | THE NUMBER OF RUNNING TIMES |
|---|---|
| $P_0$ | $U_0$ |
| $P_1$ | $U_1$ |
| $P_2$ | $U_2$ |
| $P_3$ | $U_3$ |
| ⋮ | ⋮ |

ON-VEHICLE NAVIGATION SYSTEM HAVING ROUTE SEARCHING FUNCTION

This is a continuation of application Ser. No. 08/582,732, now U.S. Pat. No. 5,877,708 filed Jan. 4, 1996, the disclosure of which is incorporated herein by reference.

BACKGROUND OF THE INVENTION

1. Field of the Invention

The present invention relates to an on-vehicle navigation system having a route searching function.

2. Description of Background Information

There is a well known on-vehicle navigation system which is constructed such that map data including road data produced by converting each point on roads of a map to numerical values is stored into a memory medium such as a CD-ROM or the like, a group of map data in an area of a predetermined range including the present location of a vehicle is read out from the memory medium and is displayed on a display as a map of a region around the present location of the vehicle while recognizing the present location of the vehicle, and a vehicle's location indicative of the present location of the vehicle is automatically displayed on the map.

Since the conventional on-vehicle navigation system constitutes what is called a locating system which merely shows the present location of the vehicle to passengers by means of a display, an on-vehicle navigation system having a function for automatically searching for traveling routes to a destination and for performing guidance has been developed recently. When the route is searched for, a calculating method such as a Dijkstra method or the like for obtaining the shortest distance is generally used. According to this method, weights are produced for a road between crossings in consideration of road attributions such as express highway, distance, road width, and the like and a route in which the sum of the weights is the minimum value is derived as a guiding route.

A conventional route searching function will now be specifically explained. It is now assumed that there are a plurality of roads as shown by solid lines in FIG. 1 and intersection points A, B, . . . , and E are set to points as crossings of the roads. One road between the crossings is now called a "road unit". A numerical value written to each road unit denotes a weight of the road unit. For running from a point "A" (selected as a start point) to a point "B"; the following three routes 1, 2, and 3 are conceivable.

Route 1: A→C→B
Route 2: A→D→B
Route 3: A→C→E→B

Figure 1:
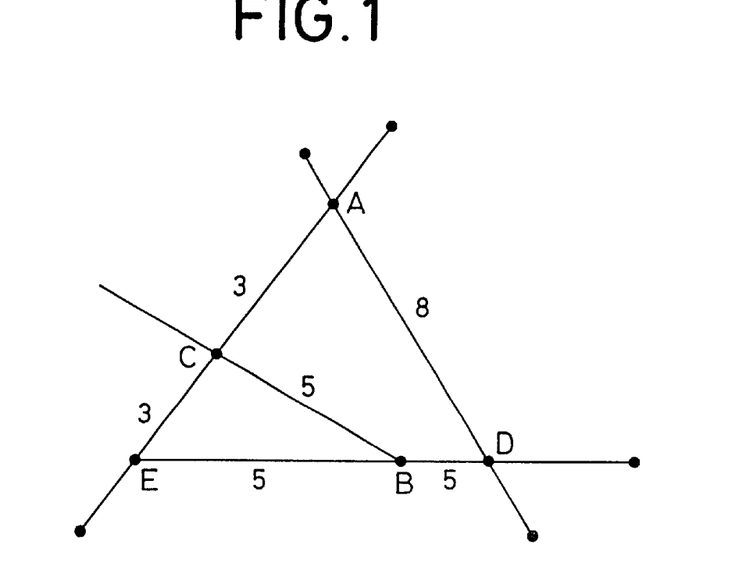
FIG. 1 is a road diagram for explaining a conventional route searching method.

The sum of weights for each route is shown as follows:

Route 1: 3+5=8
Route 2: 8+5=13
Route 3: 3+3+5=11

Figure 2:
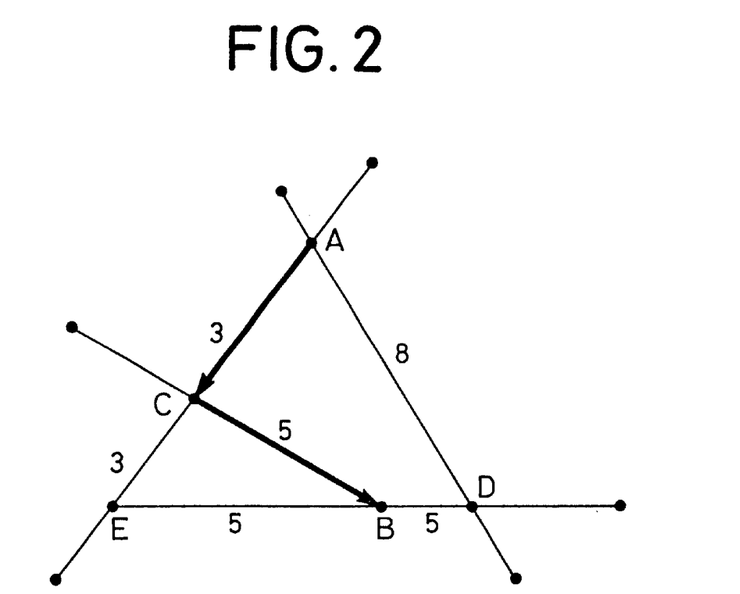
FIG. 2 is a road diagram for explaining the conventional route searching method.

Among the three routes, since the sum of the weights of the route 1 which is shown by bold lines in FIG. 2 is the minimum, the route 1 is to be selected as a guiding route.

In such a conventional route searching operation, however, there is a problem such that even in such a case that the user, e.g., a driver or the like, can reach the destination in a shorter time by taking a route selected according to the user's run experiences than following the guiding route, the same route is always automatically selected as a guiding route from the same point to the same destination as long as a new road attribute which changes the weight is not generated.

OBJECTS AND SUMMARY OF THE INVENTION

It is, therefore, an object of the invention to provide an on-vehicle navigation system having a route searching function of selecting a guiding route to a destination in addition to the user's run experiences.

An on-vehicle navigation system having a route searching function of the invention comprises: first memory means in which road information has been stored; means for searching for a plurality of traveling routes which can be taken between a start point and a destination, from the road information in the first memory means; second memory means for storing preset weights respectively corresponding to road units contained in the road information; discriminating means for discriminating a road unit which a vehicle is running when the vehicle is running; means for generating run experience data indicating that the vehicle has run the road unit discriminated by the discriminating means; third memory means for storing the generated run experience data by correlating it to the discriminated road unit; means for reading out the weight of each road unit in the traveling route and the corresponding road experience data from the second and third memory means for each of the plurality of traveling routes; means for correcting the weight read out for each road unit in the traveling route by the corresponding run experience data for each of the plurality of traveling routes; weight summing means for calculating a sum value of corrected weights corresponding to each of the road units in the traveling route for each of the plurality of traveling routes; and means for selecting a traveling route of which sum value is the minimum from the plurality of traveling routes.

According to the invention, the run experience data indicative of the run experience is formed and stored for each road unit which the vehicle has run, a plurality of traveling routes which can be run between the start point and the destination are searched for at the time of the route searching operation, the weights of the road units in the traveling route and the corresponding run experience data are obtained from the memory means for each of plurality of traveling routes, the weights are corrected by the corresponding run experience data for each road unit in the traveling route for each of the plurality of traveling routes, the sum value of the corrected weights corresponding to the road units in the traveling route is calculated for each of the plurality of traveling routes, and the traveling route of which sum value is the minimum is selected from the plurality of traveling routes.

DETAILED DESCRIPTION OF THE PREFERRED EMBODIMENTS

An embodiment of the invention will now be described in detail hereinbelow with reference to the drawings.

Figure 3:
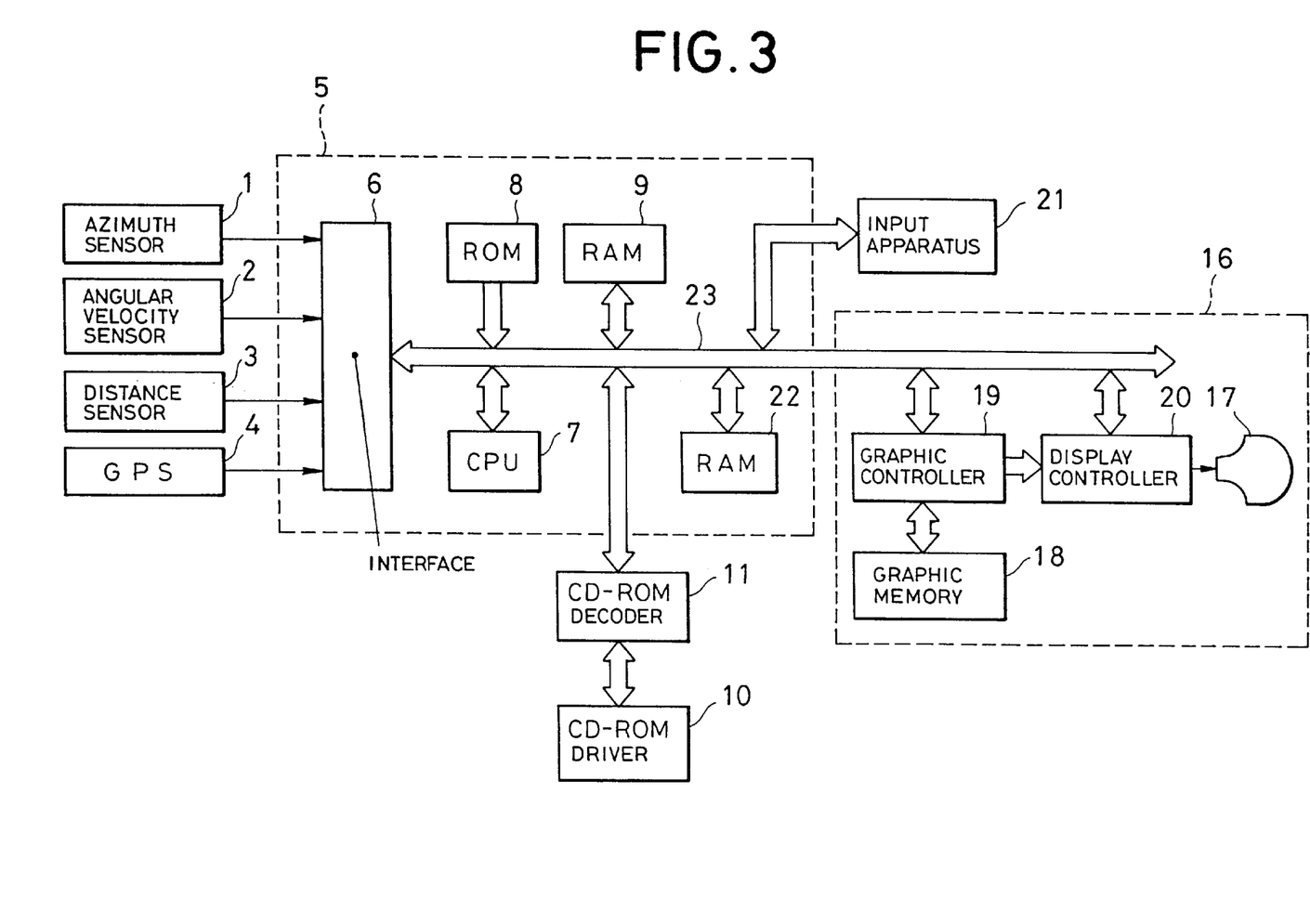
FIG. 3 is a block diagram showing an embodiment of the invention.

FIG. 3 shows a vehicle navigation system to which a route searching method according to the invention is applied. In the vehicle navigation system, an azimuth sensor 1 detects a run azimuth of a vehicle, an angular velocity sensor 2 detects an angular velocity of the vehicle, a distance sensor 3 detects a travel distance of the vehicle, and a global positioning system (GPS) 4 detects an absolute location of the vehicle from latitude and longitude information and the like. Detection outputs of the sensors and the system are supplied to a system controller 5. For example, a terrestrial magnetic sensor for detecting the run azimuth of the vehicle by a terrestrial magnetism (earth magnetic field) is used as an azimuth sensor 1. The distance sensor 3 comprises a pulse generator for generating pulses for every rotation of a predetermined angle of a drive shaft (not shown) of the vehicle. The pulse generator is a known pulse generator for magnetically or optically detecting an angle position of the rotation of the drive shaft and for generating pulses.

The system controller 5 is constructed by: an interface 6 for receiving the detection outputs of the sensors 1 to 3 and system 4 and performing processes such as an A/D (analog/digital) conversion and the like; a central processing unit (CPU) 7 for executing various image data processes and arithmetic operations of a run distance, a run direction (azimuth), and coordinates (longitude and latitude) of the present location, and the like of the vehicle on the basis of the output data of the sensors (system) 1 to 4 which is sequentially transmitted from the interface 6; a read only memory (ROM) 8 in which various processing programs of the CPU 7 and other necessary information have preliminarily been written; and random access memories (RAMS) 9 and 22 to/from which information necessary for executing the programs is written and read out. A voltage obtained by regulating an output voltage of a battery (not shown) is supplied to the RAM 9 even when a power source of the navigation system is shut off. Thus, the RAM 9 is backed up so that data such as longitude and latitude data, location display pattern data, and the like, which will be described hereinafter, is not extinguished. The RAM 22 is also backed up when the power source of the navigation system is shut off. A data table of the number of running times, which will be described hereinafter, is formed in the RAM 22.

For example, a CD-ROM serving as a read only nonvolatile memory medium is used as an external memory medium. It is not limited to the CD-ROM but a non-volatile memory medium such as DAT, IC card, or the like can be also used as an external memory medium. In addition to the map data obtained by converting respective points on roads of the map into digital values (numerical values), the longitude and latitude data indicative of a range of each road unit as road information, connecting relation data between the road units, and point display pattern data, which will be described hereinafter, have preliminarily been stored in the CD-ROM. The information stored in the CD-ROM is read out by a CD-ROM driver 10. A read output of the CD-ROM driver 10 is decoded by a CD-ROM decoder 11 and is transmitted to a bus line 23.

When the vehicle is running, the CPU 7 calculates the run direction (azimuth) of the vehicle on the basis of the output data of the azimuth sensor 1 at a predetermined period by a timer interruption, obtains the longitude and latitude data as coordinate data of the present location of the vehicle from the run distance and run azimuth by interruptions at every predetermined travel distance based on the output data of the distance sensor 3, collects the map data in the area of a predetermined range including the present location coordinates from the CD-ROM, and temporarily stores the collected data into the RAM 9 and supplies the data to a display apparatus 16.

The display apparatus 16 is constituted by: a display 17 such as a CRT or the like; a graphic memory 18 comprising a V(Video)-RAM or the like; a graphic controller 19 for drawing the map data sent from the system controller 5 as image data in the graphic memory 18 and for outputting the image data; and a display controller 20 for controlling so as to display the map on the display 17 on the basis of the image data generated from the graphic controller 19. An input apparatus 21 comprises a keyboard or the like for generating various commands and the like to the system controller 5 by a key operation of the user. As keys, there are provided keys such as selection key (not shown) for selecting items shown on the display 17, cursor key (not shown) for designating the location on the map displayed by the display 17, and the like.

A route searching operation which is executed by the CPU 7 will now be described with reference to flowcharts shown in FIGS. 4 and 5.

Figure 4:
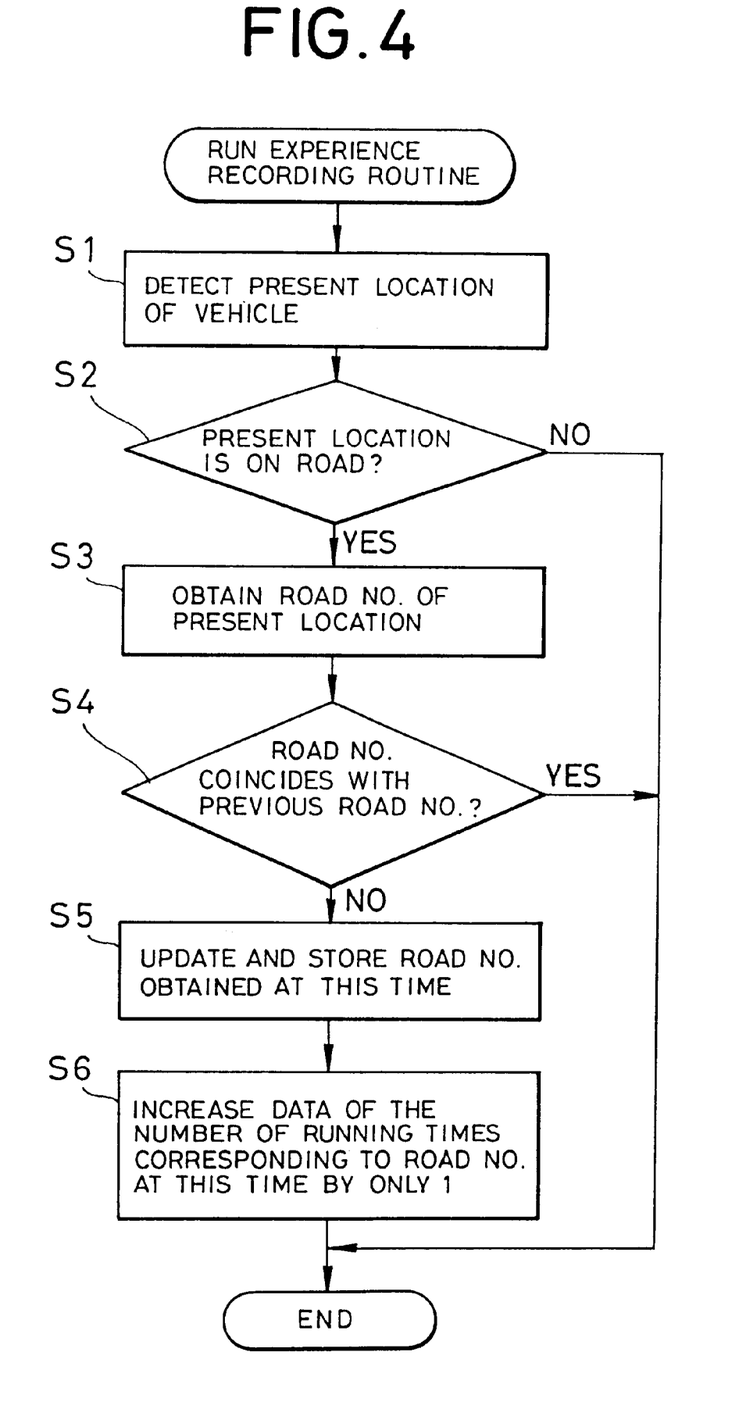
FIG. 4 is a flowchart showing a run experience recording routine.
Figure 6:
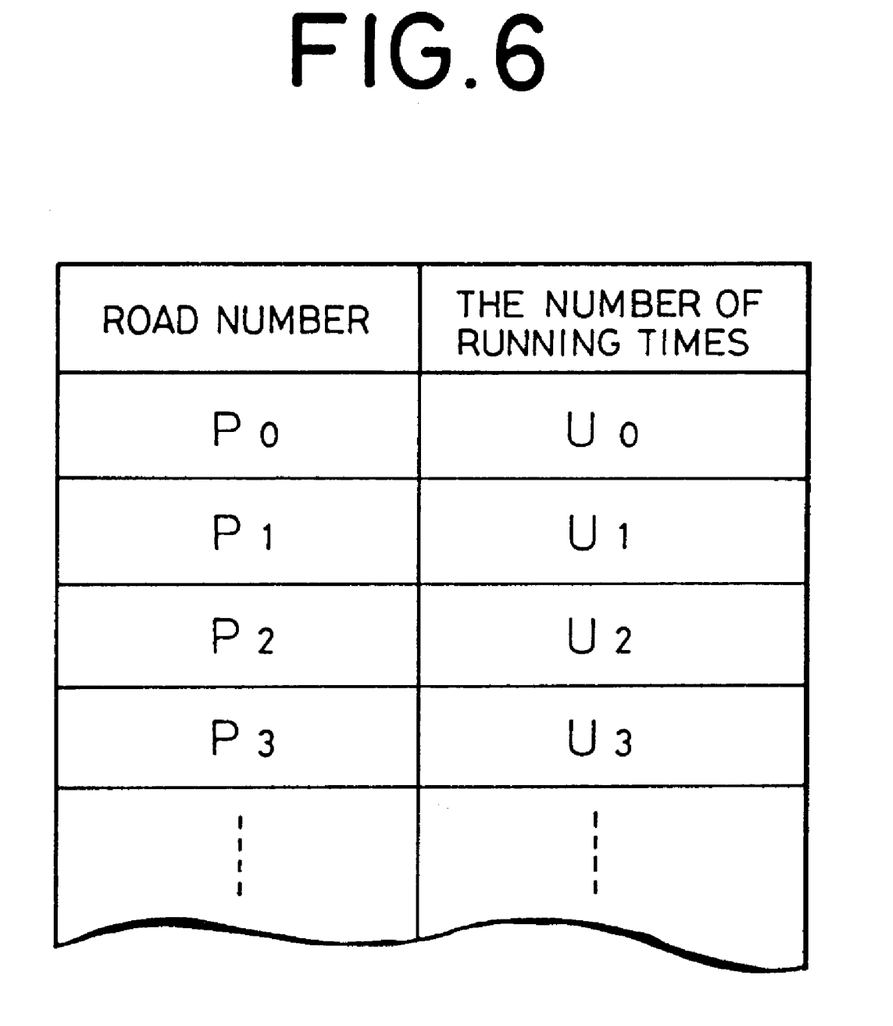
FIG. 6 is a diagram showing a data table of the number of running times.

FIG. 4 shows a run experience recording routine. The run experience recording routine is repeatedly executed by the CPU 7 at a predetermined period while the vehicle is running. The CPU 7 first detects the present location of the vehicle (step S1). As mentioned above, the run azimuth of the vehicle is calculated on the basis of the output data of the azimuth sensor 1 and the coordinate data of the present location of the vehicle is obtained from the travel distance and the travel azimuth by an interruption every time the vehicle runs a predetermined distance, based on the output data of the distance sensor 3. A check is made to see whether the present location is on the road or not from the coordinate data of the present location of the vehicle (step S2). That is, by using a map matching method, it is judged whether or not the coordinate data of the present location is included in the range of the coordinate data on the roads recorded in the CD-ROM. When the present location is not on the road, the main routine is finished. On the other hand, when the present location is on the road, the road number is obtained from the road information recorded in the CD-ROM (step S3). The road numbers have been added to the road units as road information in the CD-ROM. The road number corresponding to the road unit judged by the map matching in step S2 is searched for. A check is made to see if the obtained road number coincides with the road number previously obtained (step S4). Memory locations at which the road numbers are stored have been provided in the RAM 9 and the road number obtained at the previous time is read out from the memory location and a check is made to see whether the previous road number coincides with the road number obtained at this time or not. When the road numbers coincide, this means that the vehicle exists on the same road unit as that of the previous time, the main routine is finished. When the road numbers do not coincide, however, this means that the vehicle started to run a new road unit, so that the road number obtained at this time is updated and stored in the RAM (step S5). Data of the number of running times which corresponds to the road number of this time is increased by only one (step S6). A data table of the number of running times for storing the numbers of running times $U_0, U_1, U_2, \ldots$ for the road numbers $P_0, P_1, P_2, \ldots$ is provided for the RAM 22 as shown in FIG. 6. All of the numbers of running times are equal to zero in the initial state. The number of running times corresponding to the road number at this time is, therefore, added and updated by only +1 in the data table of the number of running times in step S6.

Figure 5:
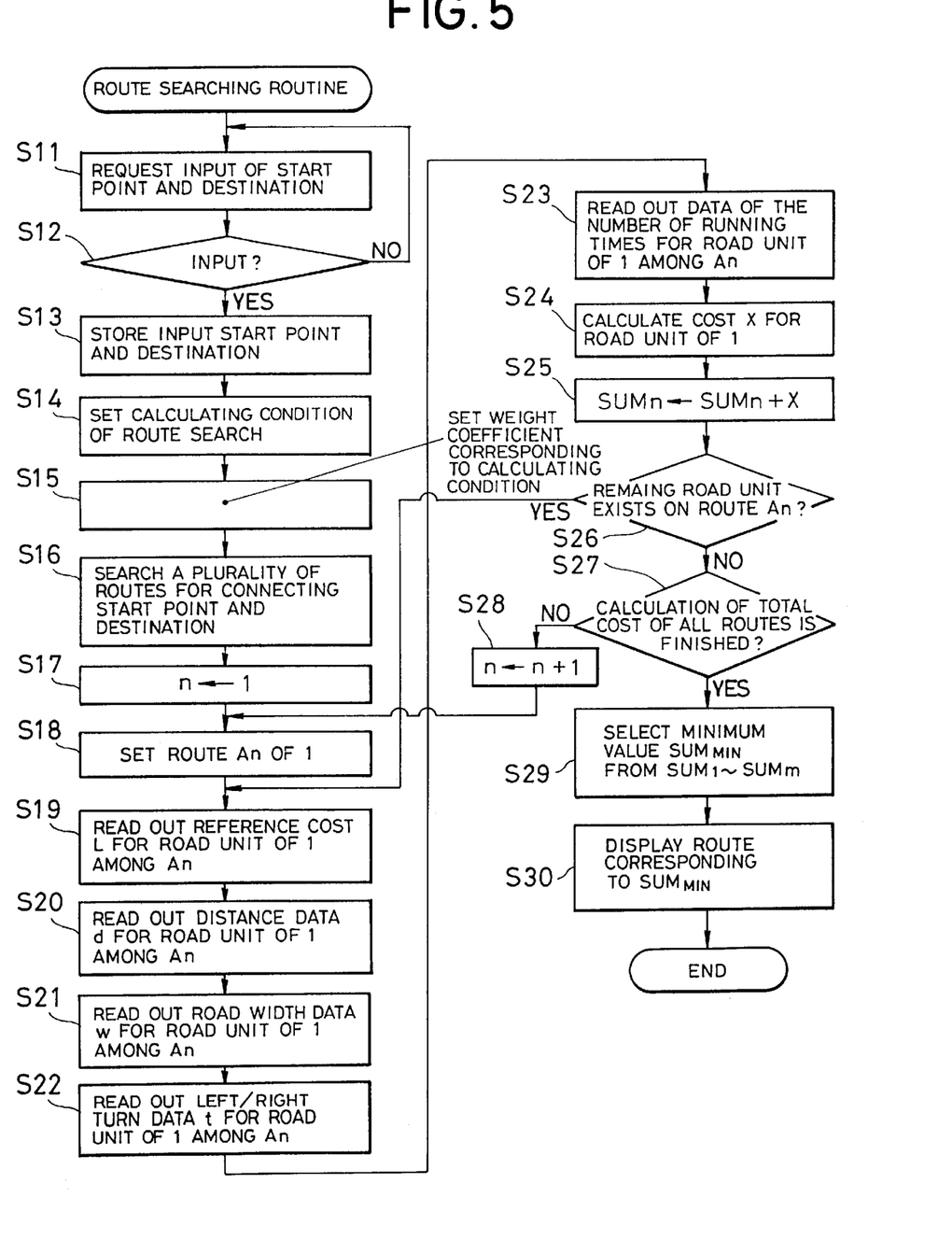
FIG. 5 is a flowchart showing a route searching routine.

FIG. 5 shows a route searching routine. The route searching routine is executed, for example, in response to a predetermined key operation of the input apparatus 21. In the route searching routine, the CPU 7 first requests an input of a start point and a destination (step S11). For instance, this is executed in a manner such that the request for the input of the start point is displayed on the display 17 and the user is instructed to designate the location in the map in which the start point is displayed by a cursor key operation of the input apparatus 21. After the start point was designated, the user is also instructed to designate the destination in a manner similar to the start point. The coordinate data of the start point and destination can be also designated from the input apparatus 21. When the present location is the start point, further there is no need to designate the start point, but the present location can be also detected from the sensor output like a processing step S1. After executing step S11, a check is made to see whether the departure and destinations have been designated or not (step S12). If the answer is YES, the departure and destinations are received and stored in the RAM 9 (step S13).

When the departure and destinations are set as mentioned above, a calculating condition of the route search is set (step S14) and weight coefficients of the respective data are set in accordance with the calculating condition of the route search (step S15). The calculation of the route search is executed on the basis of distance data "d", road width data "w", left/right turn data "t", and run experience data "u". As a calculating condition, the order of allocating importance to those data is determined. In accordance with the order of the data, the weight coefficients, namely, a weight coefficient "β" of the distance data "d", a weight coefficient "γ" of the road width data "w", a weight coefficient "δ" of the left/right turn data "t", and a weight coefficient "ε" of the run experience data "u" are set. For example, when the distance data is ignored, the weight coefficient "β" of the distance data "d" is set to zero.

It is assumed that when the vehicle runs the road unit, it takes a cost as a weight according to the road attribute, thereby showing that as the cost is low, the running is easy. A reference cost "L" has been previously determined for each road unit. In order to correct the reference cost "L", the distance data "d", road width data "w", and left/right turn data "t" have been predetermined. The distance data "d" is large as the distance of the road unit is short. The road width data "w" is large as the road unit width is wide. The left/right turn data "t" is large as the number of right or left turns is small in the road unit. The reference cost "L", distance data "d", road width data "w", and left/right turn data "t" are recorded in the CD-ROM as road information for each road unit.

After executing step S15, the CPU 7 searches and obtains a plurality of routes for connecting the start point and the destination from the road information recorded in the CD-ROM (step S16). For example, the routes are set as follows. Route 1: road unit "a"→road unit "c"→road unit "d". Route 2: road unit "b"→road unit "e"→road unit "d". Route 3: road unit "a"→road unit "c"→road unit "f"→road unit "g". The route is set as a train of road units having the connecting relation from the road units in a predetermined area including the start point and the destination. In the event that a plurality of routes cannot be obtained, only one route is set. It is now assumed in the embodiment that "m" routes are set. When a plurality of routes are set, a variable "n" is set to 1 (step S17), a route An of 1 among the plurality of routes obtained is set (step S18). The road unit of 1 among all of the road units in the route An of 1 is selected and the reference cost "L", distance data "d", road width data "w", and left/right turn data "t" for the road unit of 1 is read out from the road information recorded in the CD-ROM (steps S19 to S22). Further, the data of the number of running times as run experience data "u" for the road unit of 1 is read out from the RAM 22 (step S23). A cost "X" for the road unit of 1 is calculated on the basis of the weight coefficients set in step S15 and the cost "L" and data read out in steps S19 to S23 (step S24). With respect to the calculation of the cost "X", a data amount "λ" to be considered is first calculated by the following equation on the basis of the distance data "d", road width data "w", left/right turn data "t", and run experience data "u".

$$\lambda = \beta d + \gamma w + \delta t + \epsilon u \quad (1)$$

A coefficient α is calculated by the following equation from the calculated data amount λ to be considered.

$$\alpha = 1.0 - \lambda \quad (2)$$

The reference cost "L" is multiplied by the coefficient α as shown in the following equation, thereby calculating the cost "X".

$$X = \alpha L \quad (3)$$

When the data amount λ is equal to zero "λ=0), α=1.0 from the equation (2), so that the cost "X" is equal to the reference cost "L". When λ>0, α<1.0 is obtained from the equation (2), so that the cost "X" is smaller than the reference cost "L". When λ<0, α>1.0 is obtained from the expression (2), so that the cost "X" is larger than the reference cost "L".

When the cost "X" is calculated for the road unit of 1 in the route An among the plurality of routes in step S24, the cost "x" is added to a total cost SUMn (step S25). After that, a check is made to see whether the other road units of which cost "X" is not calculated remain in the route An or not (step S26).

Each of total costs SUM1 to SUMm is set to an initial value 0 when the execution of the main routine is started. When there are remaining road units of which cost "X" is not calculated, the processing routine is returned to step S19 in order to calculate the cost "X" for the road unit of 1 among the remaining road units and the above-mentioned operations are repeated.

On the other hand, when there is no remaining road unit of which cost "X" is not calculated, a check is made to see whether the totalling of the costs "X" of all of the plurality "m" of routes obtained in step S16 has been finished or not (step S27). When the totalling of the costs "X" for all of the plurality of routes is not finished, "1" is added to the variable "n" (step S28), the processing routine is returned to step S18, and the total of the costs "X" of the remaining routes is calculated. When the totalling of the costs "X" of all of the plurality of routes is finished, the total costs SUM1 to SUMm of the plurality of routes are obtained. The CPU 7, therefore, selects the minimum value as $SUM_{MIN}$ from the total costs SUM1 to SUMm (step S29) and instructs to display the route corresponding to the minimum value $SUM_{MIN}$ as a guiding route onto the map displayed on the display 17 (step S30). For example, the road information including the coordinate data of the road units belonging to the guiding route is consequently read out from the CD-ROM and is supplied to the display apparatus 16. Image data in the graphic memory 18 is rewritten and the road portions in the guiding route on the map, are displayed on the display 17 by a color which can be specified.

Figure 7:
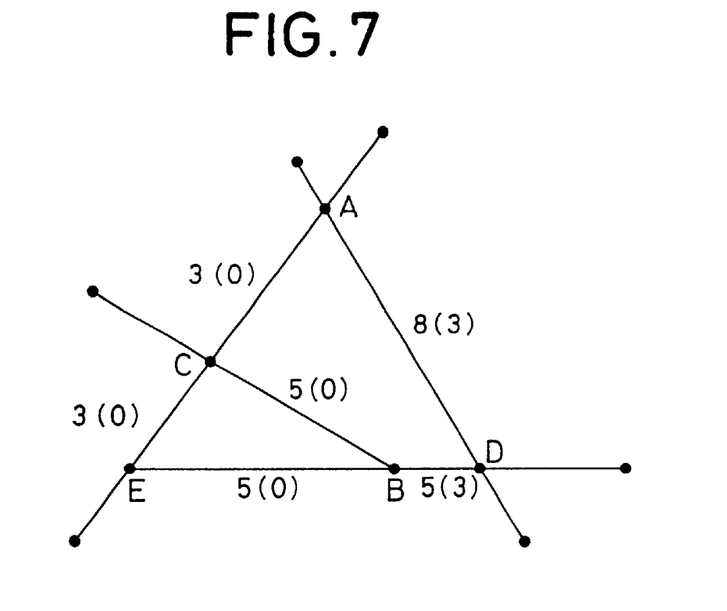
FIG. 7 is a road diagram for explaining a road searching operation of an apparatus according to the invention.

FIG. 7 shows a plurality of road units similar to the road units shown in FIG. 1. Each of the numerical values written to the road units between the intersection points denotes the weight, namely, the reference cost of the road unit. Each of numerical values in the parentheses subsequent to the weights denotes the number of running times of the road unit. In case of running from a point "A" as a departure point to a point "B" as a destination, the following three routes 1, 2, and 3 are considered as mentioned with respect to FIG. 1.

Route 1: A→C→B

Route 2: A→D→B

Route 3: A→C→E→B

The number of running times in the road unit between "A" and "d" is equal to three. The number of running times in the road unit between "d" and "B" is equal to three. The numbers of running times with respect to the other road units are equal to zero. From the equations (1) to (3), with respect to the road unit between "A" and "d", when it is assumed that $\lambda = 3/8$ from the equation (1) in consideration of the three running times, the following values are obtained from the equations (2) and (3).

$$\alpha = 1.0 - 3/8 = 5/8$$

$$X = (5/8) \times 8 = 5$$

With respect to the road unit between "d" and "B", when it is assumed that $\lambda = 3/5$ from the equation (1) in consideration of the three running times, the following values are obtained.

$$\alpha = 1.0 - 3/5 = 2/5$$

$$X = (2/5) \times 5 = 2$$

Figure 8:
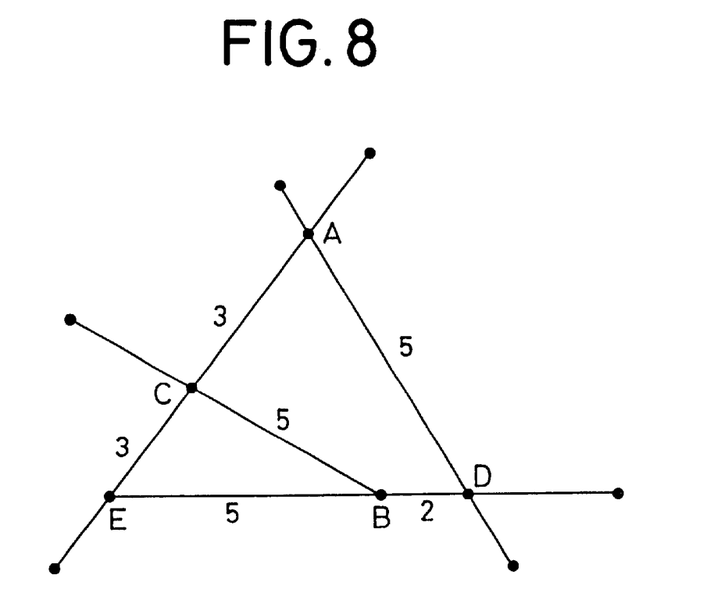
FIG. 8 is a road diagram for explaining the road searching operation of the apparatus according to the invention.

Since the weights of the road unit between "A" and "d" and the road unit between "d" and "B" are corrected as mentioned above, the weights of the road units after correction are as shown in FIG. 8. The sum values of the weights of the routes 1 to 3, therefore, are as follows.

Route 1: 3+5=8

Route 2: 5+2=7

Route 3: 3+3+5=11

Since the route 2 among the three routes has the minimum weight sum value, the route 2 is selected as a guiding route.

Although only the number of running times of the road unit has been used as run experience data in the above embodiment, the invention is not limited to it. A running time, a running speed, and a running direction can be also used as run experience data. It is considered that an accumulation time obtained by accumulating the times during which the vehicle has run the road unit and a mean time derived by dividing the accumulation time by the number of running times is used as a running time. In addition to a method of merely using a speed of the vehicle when data is detected, a running speed can be also calculated from the running time and the road distance. The road distance can be obtained from the road information preliminarily recorded in the CD-ROM or can be also measured from the running distance when the car is running and can be used. When the data of the number of running times, running time, and running speed are set to "U", "V", and "W", respectively, and weight coefficients of the number of running times, running time, and running speed are set to $\omega_U$, $\omega_V$, and $\omega_W$, the run experience data "u" is obtained as follows.

$$u = \omega_U \cdot U + \omega_V \cdot V + \omega_W \cdot W \tag{4}$$

The running direction denotes data indicative of the direction of running of the vehicle on the road unit. By using the data, two kinds of data can be possessed with respect to the number of running times, running time, and running speed. One of the two kinds of data is selected depending on the running direction of the vehicle on the road unit in the route.

According to the vehicle mounted navigation system having the route searching function of the invention as mentioned above, the run experience data indicative of the run experience is formed for each road unit which the vehicle has run and is stored, the plurality of traveling routes which the vehicle can run between the start point and the destination are searched for and the weights of the road units in the traveling route and the corresponding run experience data are obtained for a plurality of traveling routes in the route searching operation, the weight of each road unit in the traveling route is corrected by the corresponding run experience data for each of the plurality of traveling routes, the sum value of the corrected weights corresponding to the road units in the traveling route is calculated for each of the plurality of traveling routes, and the traveling route of which sum value is the minimum is selected from the plurality of traveling routes. Since the system has a learning function regarding the road running of the vehicle which the navigation system is mounted, the route including the road units which the user has run in the past is preferentially selected as a guiding route. The route search which makes the most of the run experience of the user, consequently, can be performed.

What is claimed is:

1. A navigation apparatus for guiding a travel route of a mobile vehicle, comprising:

storage means for storing data of road units;

position detection means for detecting a present position of said mobile vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means; and a route searching means for searching for a preferred travel route by using said present position of said mobile vehicle detected by said position detecting means, said data of road units stored in said storage means, and said running experience data previously stored in said running road storing means.

2. The navigation apparatus of claim 1, wherein said running experience data is retained by said running road storing means even after said mobile vehicle travels past said road unit.

3. A navigation apparatus as claimed in claim 1, wherein said route searching means searches for said preferred travel route by giving priority to shortness of a total running distance of each travel route.

4. A navigation apparatus as claimed in claim 1, wherein said route searching means searches for said preferred travel route by giving priority to fewness of a total number of left and right turns of each travel route.

5. A navigation apparatus as claimed in claim 1, wherein said route searching means searches for said preferred travel route by giving priority to broadness of widths of road units constituting each travel route.

6. A navigation apparatus for guiding a travel route of a mobile vehicle comprising:

storage means for storing data of road units;

position detection means for detecting a present position of said mobile vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means; and a route searching means for searching for a preferred travel route by using said present position of said mobile vehicle detected by said position detecting means, said data of road units stored in said storage means, and said running experience data previously stored in said running road storing means, wherein said running road storing means stores the number of times of running on each road unit determined by said road unit determining means as said running road experience data, and wherein said route searching means searches for said preferred travel route by using said number of times of running on each road unit.

7. A navigation apparatus for guiding a travel route of a mobile vehicle, comprising:

storage means for storing data of road units;

position detection means for detecting a present position of said motor vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means and a number of times of running of said mobile vehicle on said road unit; and a route searching means for searching for a preferred travel route by using said data of road units stored in said storage means, and said running experience data previously stored in said running road storing means, wherein said route searching means searches for the preferred travel route by giving priority to road units having higher numbers of times of running.

8. The navigation apparatus of claim 7, wherein said running experience data is retained by said running road storing means even after said mobile vehicle travels past said road unit.

9. A navigation apparatus for guiding a travel route of a mobile vehicle comprising;

storage means for storing data of road units;

position detection means for detecting a present position of said mobile vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means and a running speed of said mobile vehicle on said road unit; and a route searching means for searching for a travel route by using said data of road units stored in said storage means, and said running experience data previously stored in said running road storing means.

10. The navigation apparatus of claim 9, wherein said running experience data is retained by said running road storing means even after said mobile vehicle travels past said road unit.

11. A navigation apparatus for guiding a travel route of a mobile vehicle, comprising:

storage means for storing data of road units;

position detection means for detecting a present position of said mobile vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means and a running time of said mobile vehicle on said road unit; and a route searching means for searching for a travel route by using said data of road units stored in said storage means, and said running experience data previously stored in said running road storing means.

12. The navigation apparatus of claim 11, wherein said running experience data is retained by said running road storing means even after said mobile vehicle travels past said road unit.

13. A navigation apparatus for guiding a travel route of a mobile vehicle, comprising:

storage means for storing data of road units;

position detection means for detecting a present position of said mobile vehicle;

road unit determining means for determining a road unit on which said mobile vehicle is running based on said present position of said mobile vehicle detected by said position detection means;

running road storing means operable to store running experience data for said road unit determined by said road unit determining means as said mobile vehicle travels on said road unit determined by said road unit determining means and a number of times of running, a running time, and a running speed of said mobile vehicle on said road unit;

selecting means for selecting at least one of said number of times of running, said running time, and said running speed from said running experience data; and a route searching means for searching for a travel route by using said data of road units stored in said storage means, and running experience data selected by said selecting means.

14. The navigation apparatus of claim 13, wherein said running experience data is retained by said running road storing means even after said mobile vehicle travels past said road unit.

* * * * *